United States Patent
Kuehl et al.

[11] 3,731,651
[45] May 8, 1973

[54] REACTOR SEAL

[75] Inventors: Donald K. Kuehl, Manchester, Conn.; Harry A. Nutter, Longmeadow, Mass.; Raymond C. Smart, Hazardville, Conn.

[73] Assignee: United Aircraft Corporation, East Hartford, Conn.

[22] Filed: Dec. 14, 1970

[21] Appl. No.: 97,697

[52] U.S. Cl. .................118/49.5, 118/620, 277/135
[51] Int. Cl. ..............................................C23c 13/10
[58] Field of Search.....................118/125, 48–49.5, 118/404, 405, 620; 277/135; 117/107.1, 46 CG

[56] References Cited

UNITED STATES PATENTS

| | | | |
|---|---|---|---|
| 1,144,595 | 6/1915 | Henderson | 118/405 X |
| 1,882,459 | 10/1932 | Tyner | 118/405 |
| 2,787,980 | 4/1957 | McDermott | 118/405 |
| 3,538,483 | 11/1970 | Dyer | 118/49.5 X |
| 3,549,424 | 12/1970 | Rice | 118/49.1 X |
| 3,556,836 | 1/1971 | Basche et al. | 117/107.1 X |
| 3,574,665 | 4/1971 | Basche | 118/405 X |

*Primary Examiner*—Morris Kaplan
*Attorney*—John D. DelPonti

[57] ABSTRACT

In a vertical reactor wherein vapor deposition is effected on a moving filamentary substrate, a reactor seal is provided to isolate the reactant gases within the tube from the atmosphere. The reactor seal comprises an orificed fitting containing a well of liquid metal through which the filament is drawn, the liquid metal being held in the well at the orifice by surface tension forces. The orifice is established as a groove between abutting antipodal inserts which are removable in opposite directions and the liquid metal supporting surface of the well is sloped downwardly to provide complete drainage for rethreading.

5 Claims, 4 Drawing Figures

PATENTED MAY 8 1973 3,731,651
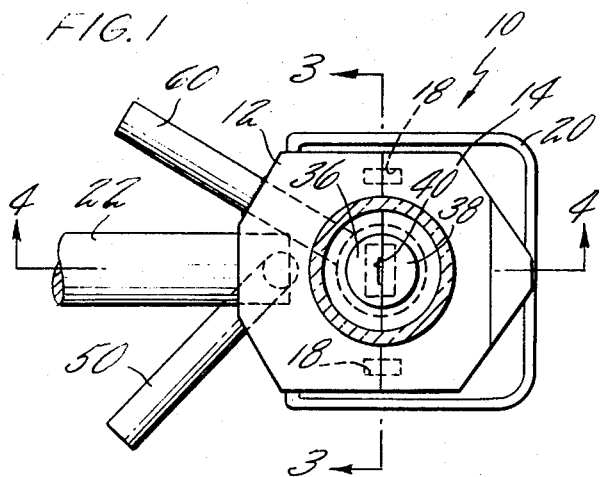
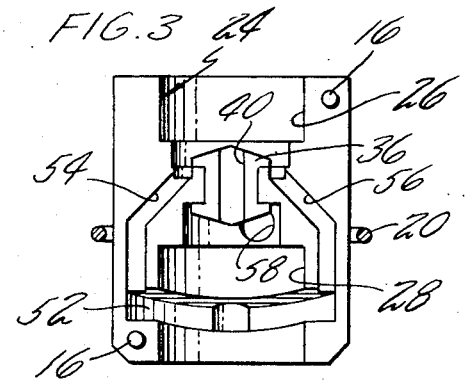
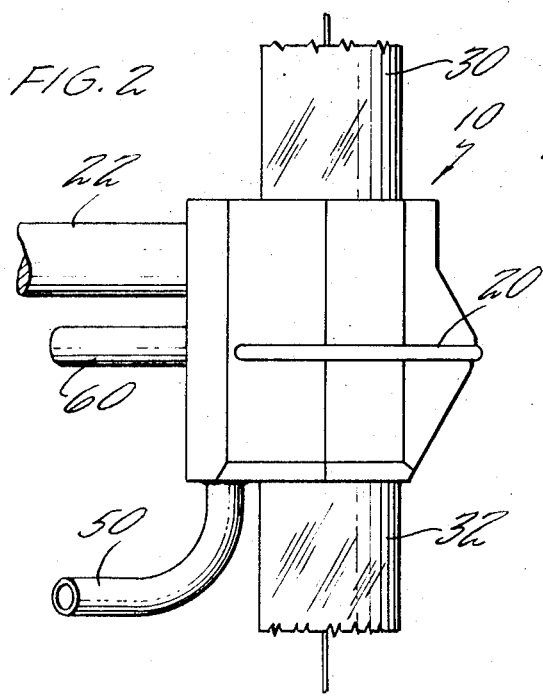
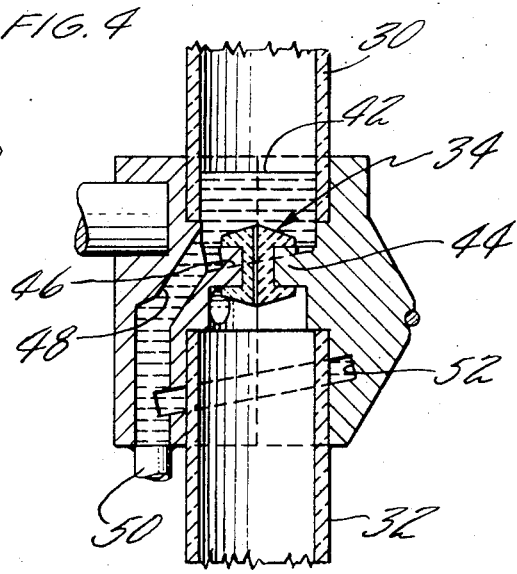
INVENTORS
DONALD K. KUEHL
HARRY A. NUTTER
RAYMOND C. SMART
BY 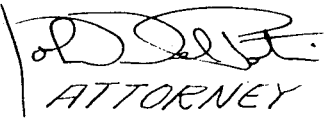
ATTORNEY

REACTOR SEAL

BACKGROUND OF THE INVENTION

This invention relates in general to sealing devices and, more particularly, to reactor seals incorporating a liquid sealant.

It is known that filamentary materials may be conveniently produced by pyrolytic techniques wherein the desired material is deposited on a resistively heated wire which is drawn through a reactant mixture containing the material in vapor form. One such technique is disclosed in U.S. Pat. No. 3,549,424 to Rice which shares a common assignee with the present invention. Improvements in the reactor seals or electrodes used in this type of method are shown in U.S. Pat. Nos. 3,453,986 and 3,453,987 to Rice et al. and St. Laurent, both also owned by the same assignee as the present invention. As commonly used in a vertical reactor, the electrode end portions are slidably received within the reactor end walls and contain the liquid sealant typically mercury or an amalgam thereof, in order to make electrical contact between a high voltage power supply and the substrate being coated and to seal the reactor, that is, to prevent the escape of reactant gases from within the reactor. While the prior art devices represent advances in the art, particularly with respect to threading of the substrate, further improvements have been sought. In particular, difficulties in mercury transport, i.e., uniformly filling and completely emptying, with concomitant spillage of mercury was found to be an inherent, serious danger in their use. Further, considerable manipulations have been required to replace glass reactor tubes or thread or rethread reactors since electrodes had to be removed for these activities and realignment thereafter has been required.

SUMMARY OF THE INVENTION

In accordance with the present invention, a liquid metal-containing reactor seal having an axial passageway through which the substrate is drawn is provided with a pair of orifice-forming abutting antipodal inserts which are removable in opposite directions to eliminate the possibility of exposure to mercury upon their withdrawal. The seal is also provided with an upper supporting surface for supporting the liquid sealant in the axial passageway, which is sloped generally downwardly to the upper end of a second passageway for efficient and complete mercury transport, particularly out of the seal. According to one aspect of the invention, the seal has at least one end of the axial passageway of sufficient dimension to slidably receive an end of the reactor vessel therewithin. According to another aspect of the invention the seal may be split axially with each seal piece carrying an orifice forming insert and with one of the seal members preferably rigidly secured to a previously aligned fixture and the other removable form the first without disturbing the vessel walls in order to facilitate substrate threading and obviate alignment problems.

BRIEF DESCRIPTION OF THE DRAWINGS

FIG. 1 is a plan view of the reactor seal;
FIG. 2 is a side elevational view of the seal;
FIG. 3 is a sectional view taken along the line 3—3 in FIG. 1, with the vessel tube removed; and
FIG. 4 is a sectional view taken along the line 4—4 in FIG. 1, with the vessel tubes in place.

DESCRIPTION OF THE PREFERRED EMBODIMENT

Referring now to the drawings, wherein like numerals indicate like parts, the numeral 10 designates a reactor seal, fitting or electrode which is preferably axially split and comprised of matching pieces 12 and 14. The electrode pieces are maintained in registered contiguity by convenient means such as the diagonally located mating pins 16 and recesses 18 and the pivoted locking strap 20. As will be appreciated, the electrode piece 12 is provided with a projection 22 which is preferably threaded for securement to an alignment fixture (not shown) in order to maintain proper positioning of the fitting during and after the threading or rethreading operation.

The electrode 10 is provided with an axial passageway 24 through which a wire passes to either make ingress to or egress from a reactor. As will be appreciated by those skilled in the art, the electrode 10 shown is particularly adapted for usage between stages in a two stage vertical reactor. In other words, the electrode passageway 24 has enlarged diameter openings 26 and 28 at its upper and lower ends respectively for the sliding receipt of glass tubular members 30 and 32. The seal is thus adapted to closely fit with the tubular members 30 and 32 which form the ends of the reaction chambers. Of course, the same electrode may be used at the lower end of the second stage reactor and at the upper end of the first stage reactor with little or no modification.

Located just below the upper tube receiving opening 26 and forming a fine orifice in the passageway 24 is a ceramic insert 34. The insert is split into two halves 36 and 38, each carried by one of the seal pieces 12 and 14, with a groove or slot 40 provided in at least one of the insert halves of a size large enough to allow free passage of the substrate therethrough yet small enough to retain liquid mercury 42 thereon through surface tension forces. The insert pieces abut in an antipodal relation and are laterally removable in opposite directions. In this way, there is no chance that the inserts, once removed, will carry with them any of the toxic mercury. It has been found that the smallest dimension, i.e., the diameter in the case of a circular hole and the width in the case of a rectangular slot, is less than 0.015 inch and preferably 0.006 to 0.008 inch. The ledgelike projections 44 which support the insert 34 form a mercury supporting surface 46 which is sloped generally downwardly with its lowest point opening to a passageway 48 which leads, via conduit 50, to a mercury reservoir. Although not shown, the reservoir is preferably of the movable type so that raising or lowering thereof is sufficient to fill or empty the electrode by gravity. In those electrodes adapted to receive the upper end of a vessel tube, a groove 52, sloped downwardly and opening at its lowest end into passageway 48 is provided in the walls of opening 28. Supplementary passageways or channels 54 and 56 communicate the mercury well floor 46 with the groove 52 to prevent leakage of reactant gases between the electrode halves as well as to improve mercury transport. An exhaust passageway 58 leading to exhaust tube 60 is provided for exhausting effluent gases from the reactor.

In operation, starting with the fitting 10 clamped together by locking strap 20 and filled with mercury, a rethreading operation is performed with facility and an extremely low degree of exposure to the toxic mercury. The mercury reservoir is lowered so that the seal 10 is gravity drained of all of its mercury contents, the mercury support surface 46 and the groove 52 being sloped at a sufficient angle to the horizontal to provide complete drainage. Next the strap 20 is unlocked and the seal piece 14 is removed. To rethread, an operator need only locate the substrate in axial alignment with the passageway 24, using the center of the slit 40 as a guide. The seal piece 14 is then replaced and clamped and the reservoir lifted to its former height.

While the invention is described in connection with a particularly preferred embodiment, no limitation is intended and modifications thereto will be evident to those skilled in the art within the true spirit and scope of the invention as set forth in the appended claims. It is contemplated, for example, that while the seal 10 may be split, with each seal piece carrying an orifice forming insert in order to facilitate the threading operation, costs and other considerations may dictate that a one piece seal be used. Such a seal would still obviate the mercury exposure problem so long as it included the inclined mercury supporting surfaces and had abutting antipodal inserts which were movable relative to the seal in opposite directions.

What is claimed is:

1. In a vertically arranged reactor vessel wherein a vapor deposition is effected on a moving substrate, a reactor seal comprising:

a liquid seal comprising a pool of mercury disposed at an end of the vessel and through which the substrate moves;

an end fitting forming an end closure for the reactor vessel, the fitting having a vertically disposed first passageway therethrough through which the substrate is drawn, a second passageway through which the mercury is transported and an open end of said vessel being slidably disposed in a close fit within one end of said first passageway;

said fitting including an upper supporting surface for supporting said liquid seal, said surface being sloped generally downwardly with its lowest point at the upper end of said second passageway;

said fitting further including a pair of abutting, antipodally disposed removable inserts disposed with the upper surface of the inserts forming part of said surface across said first passageway, one of said inserts having a channel in its abutting face to form in conjunction with the other of said inserts, an opening large enough to provide free passage of the substrate therethrough but small enough to retain the liquid sealant thereon.

2. The invention of claim 1 wherein an open end of a said vessel is slidably disposed, in close fit, in both the upper and lower ends of said first passageway, said vessel-receiving lower end having a generally downwardly sloped groove adapted for carrying mercury therein on its interior surface, the lowest end of said groove opening to said second passageway.

3. The invention of claim 2 where said fitting is split axially into two pieces, and means locking said pieces together with each piece carrying one of said inserts.

4. The invention of claim 3 wherein the face of one of said seal pieces has a channel on each side of said first passageway communicating said upper supporting surface to said downwardly sloped groove.

5. The invention of claim 4 wherein one of said pieces has means for securely mounting said reactor seal piece in axial alignment with said vessel.

* * * * *